United States Patent
Bianchi et al.

(10) Patent No.: US 8,850,956 B2
(45) Date of Patent: Oct. 7, 2014

(54) METHOD AND MACHINE FOR PREPARING ESPRESSO COFFEE

(75) Inventors: Roberto Bianchi, Bergamo (IT); Jacob Ellul-Blake, Seattle, WA (US)

(73) Assignee: La Marzocco S.R.L., Scarperia (IT)

(*) Notice: Subject to any disclaimer, the term of this patent is extended or adjusted under 35 U.S.C. 154(b) by 0 days.

(21) Appl. No.: 13/503,652

(22) PCT Filed: Oct. 25, 2010

(86) PCT No.: PCT/IB2010/002718
§ 371 (c)(1),
(2), (4) Date: Jul. 9, 2012

(87) PCT Pub. No.: WO2011/055189
PCT Pub. Date: May 12, 2011

(65) Prior Publication Data
US 2012/0269944 A1    Oct. 25, 2012

Related U.S. Application Data

(60) Provisional application No. 12/760,555, filed on Apr. 15, 2010.

(30) Foreign Application Priority Data

Oct. 23, 2009  (IT) ............................. PO20090011 U
Apr. 15, 2010  (IT) ............................. PO2010A0004

(51) Int. Cl.
    A47J 31/00    (2006.01)
    A47J 31/36    (2006.01)
    A47J 31/56    (2006.01)
    A47J 31/52    (2006.01)
    A47J 31/46    (2006.01)

(52) U.S. Cl.
    CPC ......... *A47J 31/36* (2013.01); *A47J 31/56* (2013.01); *A47J 31/52* (2013.01); *A47J 31/46* (2013.01)
    USPC .............................................. 99/279

(58) Field of Classification Search
    USPC ........... 99/281, 288, 285, 286, 290, 293, 282, 99/291, 297, 302 P, 302 R, 275; 426/433
    See application file for complete search history.

(56) References Cited

U.S. PATENT DOCUMENTS 4,858,522 A * 8/1989 Castelli .......................... 99/280
5,207,148 A * 5/1993 Anderson et al. ............... 99/281
(Continued)

FOREIGN PATENT DOCUMENTS

EP    0771542 A1    5/1997
EP    1676509 A1    7/2006
(Continued)

OTHER PUBLICATIONS

International Search Report dated Jun. 30, 2011 for PCT/IB2010/002718, 3 pp.
Written Opinion dated Apr. 23, 2012 for PCT/IB2010/002718, 3 pp.

*Primary Examiner* — Dana Ross
*Assistant Examiner* — Renee L Miller
(74) *Attorney, Agent, or Firm* — Hart IP Law & Strategies

(57) ABSTRACT

In an improved method and machine for espresso coffee there are provided one or more operating units (10) each of which comprises a boiler, a pump, a heating unit, a group (26) for aroma extraction and dispensing of the espresso coffee brew, including related conduits. Each unit (10) is equipped with a system for controlling and adjusting the espresso coffee brewing parameters, in particular the water pressure.

10 Claims, 2 Drawing Sheets

(56) References Cited

U.S. PATENT DOCUMENTS 8,367,136 B2 * 2/2013 Doglioni Majer ............ 426/431
2007/0207040 A1 9/2007 Hughes et al.

FOREIGN PATENT DOCUMENTS

| EP | 1839541 | A1 | 10/2007 |
| EP | 2027798 | A1 | 2/2009 |

* cited by examiner

METHOD AND MACHINE FOR PREPARING ESPRESSO COFFEE

CROSS-REFERENCES TO RELATED APPLICATIONS

This present application is a U.S. National Stage Entry of international application PCT/IB2010/002718 filed on Oct. 25, 2010, which in turn is a continuation-in-part of Ser. No. 12/760,555 filed Apr. 15, 2010, and international application PCT/IB2010/002718, filed on Oct. 25, 2010 claims the priority of Italian applications No. PO2099U000011, filed Oct. 23, 2009, and No. PO2010A000004, filed Apr. 15, 2010. The above-identified patent applications are hereby incorporated by reference in their entirety.

DESCRIPTION

The present application claims the priority of Italian applications no. PO2009U000011 and no. PO2010A000004 and of U.S. application Ser. No. 12/760,555, which applications are hereby incorporated by reference in their entirety.

Technical Field

The present invention relates to an improved method and machine for preparing espresso coffee. In particular, the invention relates to a method and to a machine for espresso coffee where the pressure, and in case the temperature, can be changed during coffee brewing.

Prior Art

As is known, brewing espresso coffee requires that a certain amount of water at around 90° C. be forced through a coffee pod at a nominal pressure of around 9 bar.

It is also known that the quality of the espresso is greatly influenced by pressure and temperature. In fact, the physical properties of coffee vary depending on the variety. It follows, therefore, that the parameters for an optimal brew differ for each coffee variety. Prior art machines are ordinarily equipped with a pump driven by an electrical, alternating current motor. Typically the pump is equipped with means for setting the water outlet pressure at the required value. Therefore the pressure cannot be adjusted at the user's will during coffee brewing.

Moreover, the temperature is usually controlled by a heat exchanger, an electromechanical thermostat or an electronic PID temperature controller. At best, these systems provide consistent temperature stability but cannot implement repeatable and customizable temperature profiles.

DISCLOSURE OF THE INVENTION

This invention has for an aim to overcome the above mentioned shortcomings by providing a method and a machine for preparing an espresso coffee where the brewing parameters, in particular water pressure, can be controlled and adjusted by the user. This aim is achieved with a method and a machine according to the accompanying claims.

Experts in the art will better appreciate the technical advantages of the invention from the following description with reference to the accompanying drawings, which illustrate a preferred non-limiting embodiment of it.

PREFERRED EMBODIMENT OF THE INVENTION

Figure 1:
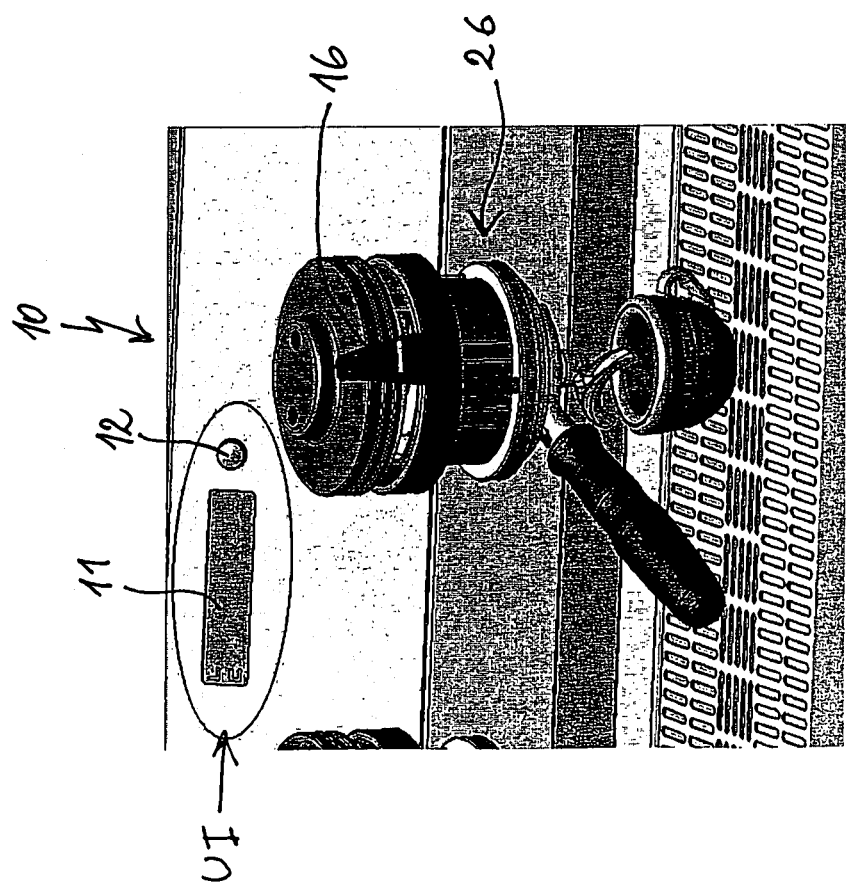
FIG. 1 is a partial front view of an espresso coffee machine according to the invention.
Figure 4:
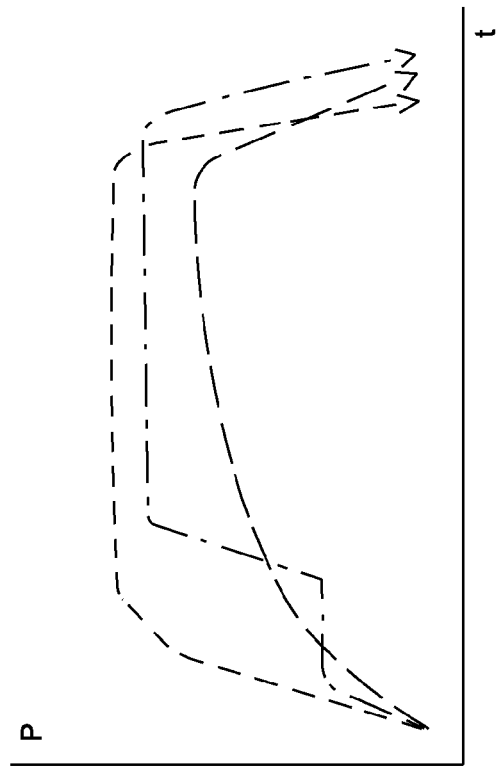
FIG. 4 shows three different pressure profiles obtainable with a machine according to the invention.

With reference to FIG. 1, an espresso coffee machine consists of one or more operating units 10, each of which comprises a pump and a boiler (both not shown) connected by related conduits to a group 26 for aroma extraction and dispensing of the espresso coffee brew.

According to the invention, as better explained below, each unit 10 is also provided with a user interface (UI), comprising a display 11 and one ore more command buttons 12, and a manual actuator 16 of the pump. For ergonomic reason the manual actuator 16 is preferably located on the brewing group 26.

Figure 2:
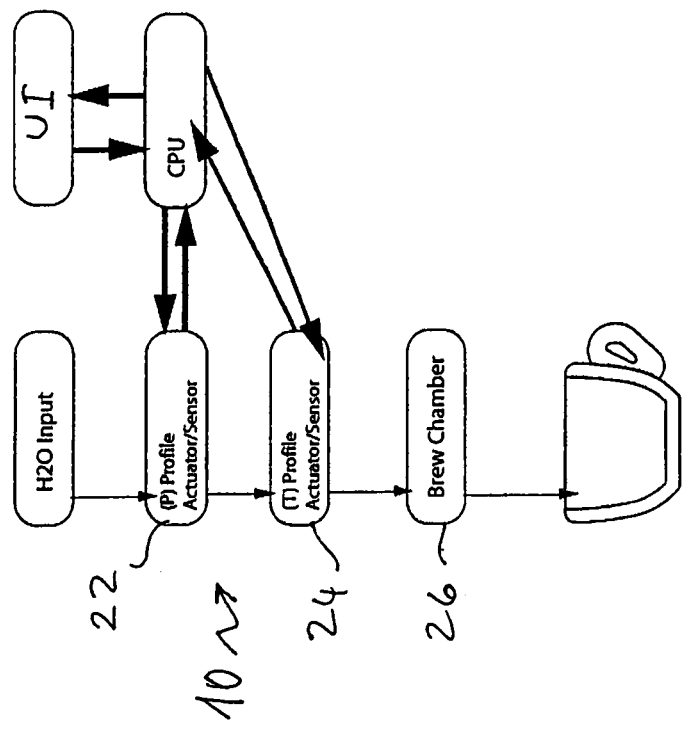
FIG. 2 is a schematic working diagram of one of the operating units of the machine.

As illustrated in FIG. 2 each unit 10 is equipped with a system for controlling and adjusting the espresso coffee brewing parameters.

The system comprises a control processing unit (CPU), f.i. a microprocessor-based printed circuit board assembly, connected to a pressure control module 22, to a temperature control module 24, in one exemplary embodiment, and to a user interface (UI).

Through the user interface, the user can adjust the extraction pressure—and in case the Temperature—in real time. This is an evident advantage because it allows the user to optimize the brewing parameters according to each different coffee blend used.

Figure 3:
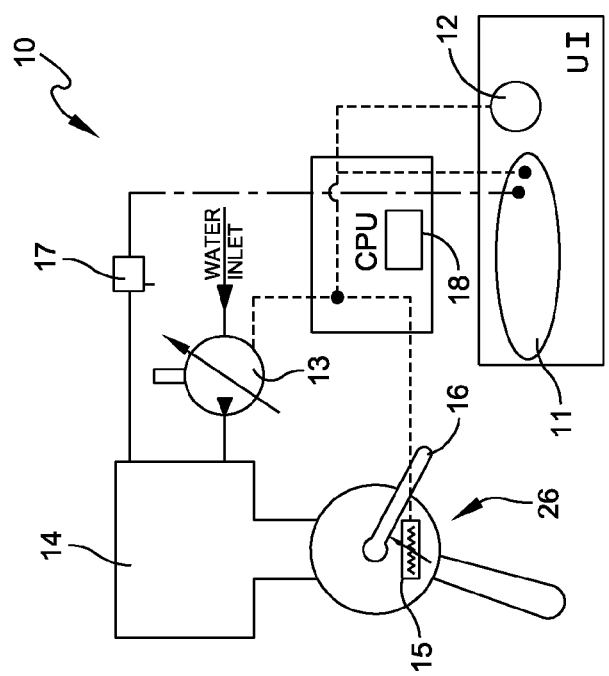
FIG. 3 shows a schematic representation of the components of a preferred embodiment of the operating unit of FIG. 2.

FIG. 3 shows a preferred embodiment of a unit 10 comprising a boiler 14 and a group 26 for aroma extraction per se known. Advantageously the unit 10 also comprises:
  a variable speed DC motor pump 13,
  a rheostat 15 manually operated by means of the lever (actuator) 16 mounted on the brewing group 26;
  a pressure transducer 17 for measuring the supply pressure of the water.

The control unit (CPU) comprises a memory and a USB port 18 for connection to an external memory device.

In a first operating mode, the pressure is manually adjusted acting with the lever 16 on the rheostat 15 which changes, through the control processing unit, the speed of the pump 13.

In this operating mode the user can change the pressure as he likes also during brewing of the espresso.

In a second operating mode, different pressure profiles are stored in the control processing unit and called up by the user. A desired pressure profile is selected by the user through the command button 12. The pump 13 is then activated acting on the rheostat 15 through the lever 16. The CPU drives the output of the associated control module—i.e. adjusts the speed of the pump 13 —in such a way as to reproduce the programmed pressure curve.

The different profiles of pressure can be stored in the memory of the CPU by recording the profiles obtained in the manually operated mode. Alternatively, predefined profiles can be downloaded from an external memory device through the USB port. It is also possible to transfer a recorded profile from the CPU to a PC, vary its shape and reload the new profile into the machine.

Three different pressure profiles obtainable according to the invention are shown in FIG. 3.

In a further preferred embodiment of the invention, the user can also control the extraction temperature in real time. The temperature profile can therefore be optimized for a particular coffee variety and easily selected through the user interface. In this case too, the CPU can be used to store different temperature profiles to be sent to the associated control module.

The embodiment described above is provided purely by way of an example and it will be understood that other equivalent embodiments are imaginable without departing from the scope of protection of the invention.

The invention claimed is:

1. An improved espresso coffee machine comprising one or more operating units, wherein each of said one or more operating units comprises a boiler, a pump, a heating unit, a brewing group for aroma extraction and dispensing of the espresso coffee brew, including related conduits, wherein each of said one or more operating units is equipped with a system for controlling and adjusting the espresso coffee brewing parameters, wherein each of said one or more operating units comprises a variable speed DC motor pump and manual actuator for adjusting water outlet pressure during coffee brewing, wherein said manual actuator comprises a rheostat operatively connected to the variable speed DC motor pump, the rheostat operatively configured to allow a user to modulate an espresso coffee brew extraction pressure, and the rheostat operatively configured to change a speed of the variable speed DC motor pump so as to vary a brewing pressure.

2. The machine according to claim 1 comprising a pressure control module for modulating the espresso coffee brew extraction pressure.

3. The machine according to claim 1 comprising a temperature control module for modulating the espresso coffee brew extraction temperature.

4. The machine according to claim 1 comprising a central processing unit (CPU) connected to a pressure control module, to an eventual temperature control module and to a user interface (UI), the central processing unit (CPU) having a port (I/O) for connection to an external memory device.

5. The machine according to claim 4 wherein different pressure profiles are stored in the central processing unit and the different pressure profiles are selectable by the user and reproduced by the pressure control module.

6. The machine according to claim 4 wherein different temperature profiles are stored in the central processing unit and the different temperature profiles are selectable by the user and reproduced by the temperature control module.

7. The machine according to claim 5, wherein a desired pressure profile is selected by the user through a command button and wherein the motor pump is activated by acting on said rheostat.

8. The machine according to claim 1, wherein said rheostat is manually operated by means of a lever mounted on the brewing group.

9. The machine according to claim 1 comprising a pressure transducer for measuring the water supply pressure.

10. The machine according to claim 1, wherein at least one of the pressure profiles includes a first time period for an increase in pressure, a second time period for a peak time period, and a third time period for a decrease in pressure.

* * * * *